(12) United States Patent
Liu

(10) Patent No.: US 11,888,680 B1
(45) Date of Patent: *Jan. 30, 2024

(54) EARLY DETECTION OF TELEMETRY DATA STREAMING INTERRUPTIONS

(71) Applicant: Juniper Networks, Inc., Sunnyvale, CA (US)

(72) Inventor: Yanqing Liu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,546

(22) Filed: Apr. 29, 2022

Related U.S. Application Data

(63) Continuation of application No. 17/304,542, filed on Jun. 22, 2021, now Pat. No. 11,323,305.

(51) Int. Cl.
| | |
|---|---|
| *H04L 41/0631* | (2022.01) |
| *H04L 41/0654* | (2022.01) |
| *H04L 67/133* | (2022.01) |
| *H04L 69/24* | (2022.01) |
| *H04L 69/22* | (2022.01) |
| *H04L 69/28* | (2022.01) |

(52) U.S. Cl.
CPC ...... *H04L 41/0645* (2013.01); *H04L 41/0654* (2013.01); *H04L 67/133* (2022.05); *H04L 69/22* (2013.01); *H04L 69/24* (2013.01); *H04L 69/28* (2013.01)

(58) Field of Classification Search
None
See application file for complete search history.

(56) References Cited

U.S. PATENT DOCUMENTS

| | | | |
|---|---|---|---|
| 7,961,172 B2 | 6/2011 | May | |
| 9,586,693 B1 | 3/2017 | Heinrich | |
| 10,613,629 B2 * | 4/2020 | Laurendeau | ........ G06F 3/04845 |
| 11,323,305 B1 | 5/2022 | Liu | |
| 2015/0178185 A1 * | 6/2015 | Voelkl | .................. G11C 7/1075 |
| | | | 711/149 |
| 2016/0173608 A1 * | 6/2016 | Laflen | ...................... H04B 7/26 |
| | | | 702/188 |
| 2018/0103206 A1 * | 4/2018 | Olson | ................ H04N 23/6812 |
| 2019/0245948 A1 * | 8/2019 | Li | .......................... H04L 69/161 |

OTHER PUBLICATIONS

Coltun et al. "OSPF for IPV6," Network Working Group, RFC5340, Jul. 2008, 94 pp.

(Continued)

*Primary Examiner* — Younes Naji
(74) *Attorney, Agent, or Firm* — Shumaker & Sieffert, P.A.

(57) ABSTRACT

A computing device may receive, from a collector device, a request to subscribe, in a target-defined mode, to network telemetry data regarding a network element associated with the computing device. The computing device may, in response to receiving the request, provision a network telemetry sensor to operate in a working mode to collect the network telemetry data regarding the network element. The collector device may send, to the collector device, the network telemetry data collected by the network telemetry sensor, wherein the network telemetry data indicates the working mode of the network telemetry sensor.

6 Claims, 6 Drawing Sheets

(56) References Cited

OTHER PUBLICATIONS

Gredler, et al., "North-Bound Distribution of Link-State and Traffic Engineering (TE) Information using BGP," Internet Engineering Task Force (IETF) RFC 7752, Mar. 2016, 48 pp.

JP. Vasseur, Ed., et al., "Path Computation Element (PCE) Communication Protocol (PCEP)," Network Working Group, RFC5440, Mar. 2009, 87 pp.

Li et al., "IS-IS Extensions for Traffic Engineering," Network Working Group, RFC5305, Oct. 2008, 17 pp.

Lindem et al., "OSPFv3 Link State Advertisement (LSA) Extendibility," Internet Engineering Task Force (IETF), RFC 8362, Apr. 2018, 33 pp.

Moy, "OSPF Version 2," Network Working Group, RFC 2328, Apr. 1998, 244 pp.

Oran, "OSI IS-IS Intra-domain Routing Protocol," Network Working Group, RFC1142, Feb. 1990 (republication of ISO/IEC 10589, last updated Nov. 2002), 217 pp.

Prosecution History from U.S. Appl. No. 17/304,542, now issued U.S. Pat. No. 11,323,305, dated Oct. 28, 2021 through Feb. 22, 2022, 42 pp.

R. Enns, Ed., et al., "Network Configuration Protocol (NETCONF)," Internet Engineering Task Force (IETF), RFC6241, Jun. 2011, 113 pp.

Sheth et al., "OSPF Hybrid Broadcast and Point-to-Multipoint Interface Type," Internet Engineering Task Force (IETF), RFC 6845, Jan. 2013, 9 pp.

\* cited by examiner

EARLY DETECTION OF TELEMETRY DATA STREAMING INTERRUPTIONS

EARLY DETECTION OF TELEMETRY DATA STREAMING INTERRUPTIONS

This application is a continuation of U.S. patent application Ser. No. 17/304,542, filed Jun. 22, 2021, the entire contents of which is hereby incorporated by reference.

TECHNICAL FIELD

The invention relates to network telemetry sensors.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form. Network telemetry sensors in the computer network may collect network telemetry data and may stream the network telemetry data to one or more collectors. The network telemetry data can be used to gather operational statistics for monitoring the health of the computer network.

SUMMARY

In general, techniques are described for early detection of pauses or interruptions in streaming of network telemetry data to a collector. A network telemetry sensor may be provisioned to monitor a network element of a computer network, such as a logical or physical interface of a network device in the computer network, and to collect network telemetry data regarding the network, such as statistics associated with the monitored network element. As the network telemetry sensor collects network telemetry data, the network telemetry sensor may stream the collected network telemetry data to a collector for use by, e.g., a network administrator to manage the computer network based on the network telemetry data.

When a network sensor pauses streaming of network telemetry data to the collector (or such streaming is otherwise interrupted), the collector does not receive the statistics of the network element monitored by the network telemetry sensor, thereby potentially depriving a network administrator of important data that is used by the network administrator to manage the computer network. Early detection of interruptions of network telemetry data may enable network administrators to more quickly investigate the cause of the pause in the streaming of network telemetry data and to more quickly fix any issues with the network telemetry data and/or the computer network, thereby decreasing the amount of network telemetry data that is not collected by the collector.

In general, a network telemetry sensor may operate in one of at least two working modes to stream network telemetry data to a collector: a periodic streaming mode or an on-change mode. When a network telemetry sensor operates under a periodic streaming mode, the network telemetry sensor may periodically send network telemetry data to a collector according to a reporting interval (e.g., every 30 seconds) regardless of whether the value included in the network telemetry data has changed. For example, if the network telemetry data includes a count of the number of packets received at a network interface, a network telemetry sensor operating in the periodic streaming mode may periodically send the count of the number of packets received at the network interface to a collector regardless of whether the count of the number of packets received at the network interface has changed.

When a network telemetry sensor operates in an on-change mode, the network telemetry sensor may send network telemetry data to a collector only when the value included in the network telemetry data has changed. For example, if the network telemetry data includes a count of the number of packets received at a network interface, a network telemetry sensor operating in the on-change mode may send the count of the number of packets received at the network interface to a collector only upon a change in the count of the number of packets received at the network interface.

To troubleshoot a network telemetry sensor operating in the periodic streaming mode, a network engineer may capture network packets and/or continuously monitor the sensor statistics of the network telemetry sensor to determine whether the network telemetry sensor is sending network telemetry data. To troubleshoot a network telemetry sensor operating in the on-change mode, a network engineer may generate trigger on-change events to activate the network telemetry sensor for data streaming, and may capture network packets and/or continuously monitor the sensor statistics of the network telemetry sensor to determine whether the network telemetry sensor is sending network telemetry data in response to such on-change events. As such, a network engineer may have to know the working mode of a network telemetry sensor in order to troubleshoot the telemetry sensor.

However, when a collector sends a request to subscribe to network telemetry data, the collector may request that the network telemetry sensor collecting and streaming the network telemetry data operate in a target-defined mode. When the collector specifies that the network telemetry sensor operate in the target-defined mode, the working mode of the network telemetry sensor might not be specified by the collector. Instead, a network device associated with the network telemetry sensor may determine the working mode of the network telemetry sensor based on other factors or conditions. As such, a network administrator or a network engineer working to manage the computer network may not have definitive knowledge of the working mode of the network telemetry sensor.

Not having definitive knowledge of the working mode of the network telemetry sensor may make it difficult to make accurate network planning decisions, as a network telemetry sensor operating in a periodic streaming mode may typically generate a larger volume of network traffic in a computer network compared with a network telemetry sensor operating in an on-change mode. Furthermore, not having definitive knowledge of the working mode of the network telemetry sensor may make it difficult to determine whether a pause or interruption in the streaming of network telemetry data by a network telemetry sensor is indicative of an error in the streaming of network telemetry data the network telemetry sensor.

For example, if the collector does not receive network telemetry data from a network telemetry sensor having a target-defined working mode for an extended period of time, such as more than thirty seconds, the collector may not have any information regarding whether a pause in the streaming of network telemetry data by a network telemetry sensor is indicative of an error in the streaming of network telemetry data the network telemetry sensor. If the network telemetry sensor is operating in an on-change mode, the network telemetry sensor may simply not have detected any changes in the value included in the network telemetry data and thus has correctly paused sending of network telemetry data to the collector until the value in the network telemetry data changes. On the other hand, if the network telemetry sensor is operating in a periodic streaming mode, the network telemetry sensor may be working correctly and may simply be waiting for the end of an associated reporting interval to send network telemetry data to the collector.

Aspects of this disclosure include techniques that enable a collector to definitely determine the working mode of a network telemetry sensor that streams network telemetry data to the collector. In one such technique, a network telemetry sensor may include, in the network telemetry data sent to the collector, an explicit indication of the working mode of the network telemetry sensor. For example, the network telemetry sensor may include, in the network telemetry data sent to the collector, an explicit indication (e.g., in the form of a flag or a bit set within the telemetry data) of whether the working mode of the network telemetry sensor is a periodic streaming mode or an on-change mode.

Including an explicit indication of the working mode of the network telemetry sensor in the network telemetry data sent to the collector may enable network administrators and engineers to more accurately make network planning decisions and to better determine whether a pause in the streaming of network telemetry data by a network telemetry sensor is indicative of an error in the streaming of network telemetry data the network telemetry sensor. In this way, the techniques of this disclosure enables network administrators to more quickly determine early on whether there is an error in the computer network that caused the pause in the streaming of network telemetry data by a network telemetry sensor, thereby enabling network administrators to more quickly investigate the cause of the pause in the streaming of network telemetry data and to more quickly fix any issues with the network telemetry data and/or the computer network, thereby decreasing the amount of network telemetry data that is not collected by the collector.

In an example, this disclosure describes a method that includes receiving by a computing device from a collector device, a request to subscribe, in a target-defined mode, to network telemetry data regarding a network element associated with the computing device; in response to receiving the request, provisioning, by the computing device, a network telemetry sensor to collect the network telemetry data regarding the network element; and sending, by the computing device to the collector device, the network telemetry data collected by the network telemetry sensor, wherein the network telemetry data indicates a working mode of the network telemetry sensor.

In an example, this disclosure describes a computing device that includes a memory; and processing circuitry in communication with the memory and configured to: receive, from a collector device, a request to subscribe, in a target-defined mode, to network telemetry data regarding a network element associated with the computing device; in response to receiving the request, provision a network telemetry sensor to collect the network telemetry data regarding the network element; and send, to the collector device, the network telemetry data collected by the network telemetry sensor, wherein the network telemetry data indicates a working mode of the network telemetry sensor.

In an example, this disclosure describes a non-transitory computer-readable storage medium encoded with instructions that, when executed, cause one or more programmable processors of a computing device to: receive, from a collector device, a request to subscribe, in a target-defined mode, to network telemetry data regarding a network element associated with the computing device; in response to receiving the request, provision a network telemetry sensor in a working mode to collect the network telemetry data regarding the network element; and send, to the collector device, the network telemetry data collected by the network telemetry sensor, wherein the network telemetry data indicates the working mode of the network telemetry sensor.

The details of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
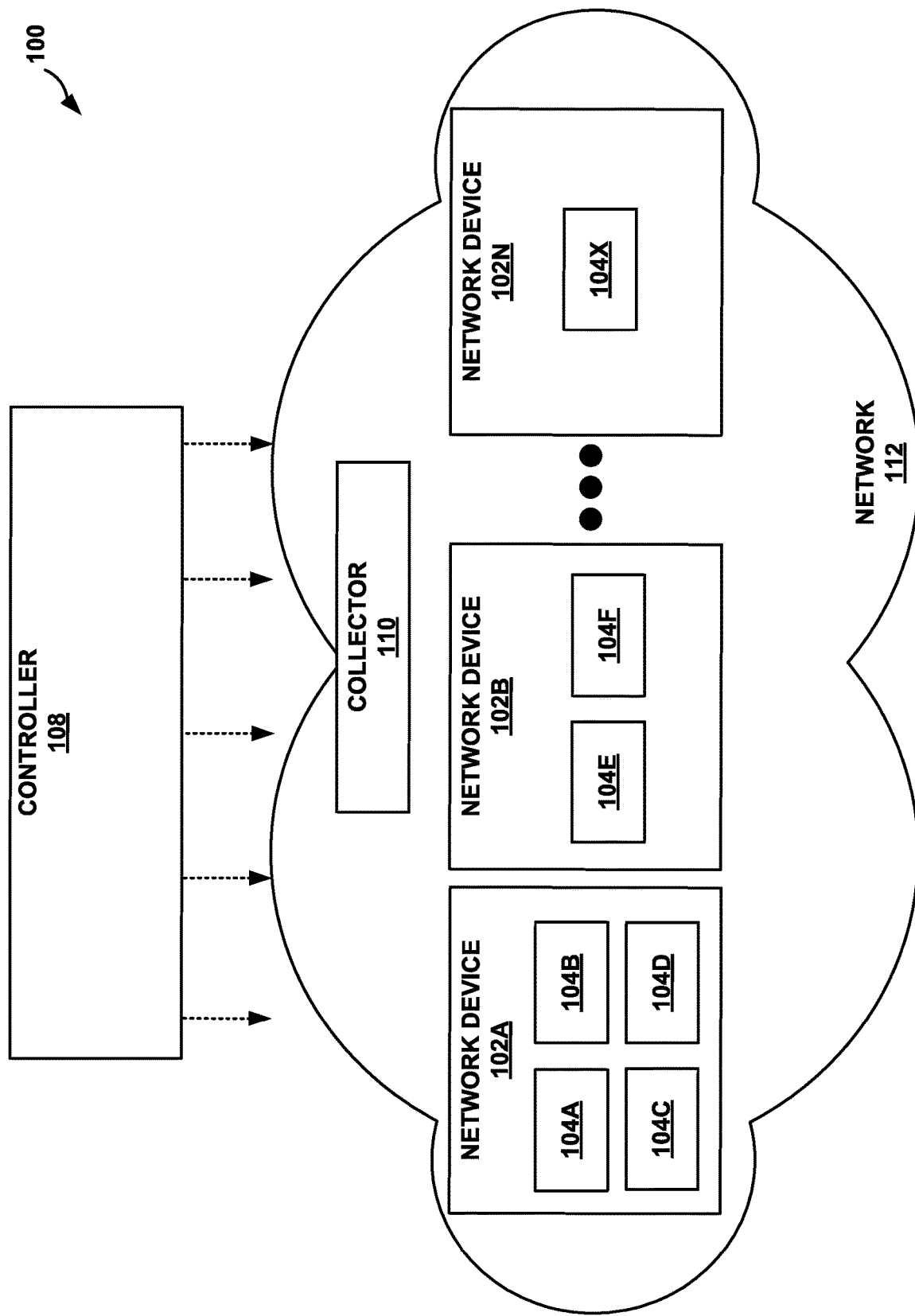
FIG. 1 is a block diagram illustrating an example system configured to operate in accordance with techniques described in this disclosure.

FIG. 1 is a block diagram illustrating an example system 100 configured to operate in accordance with techniques described in this disclosure. As shown in FIG. 1, example system includes network 112. Network 112 may include one or more computer networks (e.g., a set of interconnected L2/L3 networks) and, in some examples, may be a wide area network. Examples of network 112 may include or more autonomous systems, data centers, branch offices, private network, public networks, cloud networks, or other types of networks.

Network 112 includes collector 110 and any number of network devices 102A-102N ("network devices 102") that communicate either directly or indirectly with each other via network 112. Each of network devices 102 may represent a router, a switch, or other network device. Network devices 102 may be able to forward packets of packet flows from sources to destinations along routing paths according to techniques such as Label Switched Path (LSP).

Network devices 102 may provision network telemetry sensors 104A-104X ("network telemetry sensors 104") to collect network telemetry data associated with network 112 and/or network devices 102. Network devices 102 may provision network telemetry sensors 104 by launching, instantiating, or otherwise executing software, such as software agents, processes, and the like to collect network telemetry data associated with network 112 and/or network devices 102. In the example of FIG. 1, network device 102A may instantiate network telemetry sensors 104A-104D, network device 102B may instantiate network telemetry sensors 104E and 104F, and network device 102N may instantiate network telemetry sensor 104X.

Network telemetry data collected by network telemetry sensors 104 may include statistics of various network elements of network devices 102 and/or network 112, such as a line card, a packet processor such as a packet forwarding engine, a routing engine, and the like, and may include physical interface statistics of network elements, logical interface statistics, label-switched path (LSP) statistics including per-Multiprotocol Label Switching (MPLS) LSP statistics, and the like. Such network telemetry data may be in the form of packet counts, byte counts, routes, next hops, filter counts, or other such metrics.

Collector 110 includes one or more computing devices configured to communicate with network devices 102 to establish telemetry sessions with network devices 102 of network 112 to receive network telemetry data collected by network telemetry sensors 104. In some examples, collector 110 may be a part of a WAN controller that controls network 112. As described above, network telemetry data may be stream statistics of various elements of network devices 102, such as a line card, a packet processor such as a packet forwarding engine, a routing engine, and the like. Such network telemetry data may be sent by network devices 102 to collector 110, which may collect the statistics for use by, e.g., an administrator to make configuration changes to network 112 and/or network devices 102 of the network 112.

In general, collector 110 may establish telemetry sessions with network devices 102 according to an OpenConfig and Streaming Telemetry (OCST) standard based on a remote procedure call (RPC) protocol, such as a gRPC Network Management Interface (gNMI) protocol, so that collector 110 may use gRPC to provision network telemetry sensors 104 and to subscribe to and receive network telemetry data collected by network telemetry sensors 104 and streamed from network devices 102. The data streamed between collector 110 and network devices 102 in the telemetry sessions may, in some examples, be Google protocol buffers (gpb) structured messages. In some examples, the telemetry session may include a transmission control protocol (TCP) session and multiple hypertext transfer protocol 2 (HTTP/2) sessions over the TCP session. The HTTP/2 sessions may be multiplexed on the same TCP session.

Collector 110 may subscribe to network telemetry data for a network element of a network device, such as network device 102A, by sending a request to network device 102A to subscribe to the network telemetry data for the network element. The request to subscribe to the network telemetry data may indicate the network telemetry data to be collected for the network element. For example, if the network element is a network interface of network devices 102A, the request may indicate one or more of the following network telemetry data to be collected for the network interface: the bytes of data transmitted by the network interface, the bytes of data received by the network interface, the number of packets transmitted by the network interface, the number of packets received by the network interface, and/or the operating state of the network interface (e.g., whether the network interface is up or down). In some examples, the request may indicate the network element for which network telemetry data is requested in the form of a path, such as "/interfaces/interface/state/counters/".

Network device 102A may, in response to receiving the request to subscribe to the network telemetry data associated with the network element of network device 102A, instantiate one or more network telemetry sensors, such as one or more of network telemetry sensors 104A-104D, to collect the network telemetry data for the network element of network device 102A for streaming to collector 110. For example, network device 102A may instantiate network telemetry sensor 104A to collect the network telemetry data for the network element of network device 102A and may stream the network telemetry data collected by network telemetry sensor 104A to collector 110.

Each network telemetry sensor of network telemetry sensors 104 may operate in one of two working modes: a periodic streaming mode or an on-change mode. When a network telemetry sensor operates in a periodic streaming mode, the network telemetry sensor may periodically send network telemetry data to, for example, collector 110 according to a reporting interval, which may be five seconds, ten seconds, fifteen seconds, thirty second, and the like. For example, if a network telemetry sensor operates in a periodic streaming mode with a reporting interval of thirty seconds, the network telemetry sensor may send network telemetry data once every thirty seconds regardless of whether the value of the telemetry data has changed.

When a network telemetry sensor operates in an on-change mode, the network telemetry sensor may send network telemetry data to, for example, collector 110 only when the value of the network telemetry data has changed. As such, when a telemetry sensor operates in an on-change mode, collector 110 may not necessarily receive telemetry data from the telemetry sensor at regular intervals (e.g., every 30 seconds).

In some examples, collector 110 may specify, in a request to subscribe to the network telemetry data for a network element, the working mode of the network telemetry sensor. For example, collector 110 may specify that the network telemetry sensor operate in a periodic streaming mode or may specify that the telemetry sensor operate in an on-change mode.

In some examples, collector 110 may not specify the working mode of a network telemetry sensor. That is, collector 110 might not specify, in the request to subscribe to the network telemetry data for a network element, whether the working mode of the network telemetry sensor is a periodic streaming mode or an on-change mode. Instead, collector 110 may specify, in the request to subscribe to the network telemetry data for a network element, that the network telemetry sensor operate in a target-defined mode.

When collector 110 specifies that a network telemetry sensor operate in a target-defined mode, collector 110 generally does not specify that the working mode of the network telemetry sensor is a periodic streaming mode or an on-change mode. Instead, the working mode of the network telemetry sensor may be determined by the infrastructure of network 112, such as being determined by the network device of network devices 102 that receives the request from collector 110. That is, the infrastructure of network 112 may determine whether the working mode of the network telemetry sensor is a periodic streaming mode or an on-change mode, and the network telemetry sensor may operate in the determined working mode to collect and send network telemetry data.

However, when collector 110 specifies that a network telemetry sensor operate in a target-defined mode, collector 110 may not have any information regarding the working mode of the network telemetry sensor. That is, collector 110 may be unable to definitively determine whether the working mode of the network telemetry sensor is a periodic streaming mode or an on-change mode. If collector 110 is not able to definitively determine whether the working mode of the network telemetry sensor is a periodic streaming mode or an on-change mode, collector 110 may be unable to determine whether a pause in the streaming of network telemetry data from the network telemetry sensor is indicative of a potential issue that is preventing the network telemetry sensor from collecting, generating, packaging, and/or transmitting network telemetry data.

For example, if the working mode of the network telemetry sensor is an on-change mode, a pause in the streaming of network telemetry data from the network telemetry sensor may simply indicate that there has been no change in the value of the network telemetry data. Conversely, if the working mode of the network telemetry sensor is a periodic streaming mode, a pause in the streaming of network telemetry data from the network telemetry sensor may potentially indicate that there is a failure in network 112 that is preventing the network telemetry sensor from sending network telemetry data to collector 110.

In accordance with aspects of the present disclosure, in order to enable collector 110 to definitely determine the working mode of a network telemetry sensor, a network telemetry sensor may include, in the network telemetry data transmitted from the network telemetry sensor to collector 110, an explicit indication of the working mode of the network telemetry sensor. Specifically, the network telemetry data may include an explicit indication of whether the working mode of the network telemetry sensor is a periodic streaming mode or an on-change mode. For example, a network telemetry sensor may include, in the gRPC header of the network telemetry data, a bit that explicitly indicates whether the working mode of the network telemetry sensor is a periodic streaming mode or an on-change mode.

The network telemetry data may include an explicit indication of whether the working mode of the network telemetry sensor is a periodic streaming mode or an on-change mode regardless of whether a network telemetry sensor is provisioned to operate in a periodic streaming mode, an on-change mode, or a target-defined mode. This may be useful to indicate to administrators not involved in the sensor provisioning process to be able to determine, based on the network telemetry data, the working mode of the network telemetry sensor. Developers may also utilize the explicit indication of whether the working mode of the network telemetry sensor to treat network telemetry data differently based on the working mode of the network telemetry sensor.

In the example of FIG. 1, network device 102A may receive, from collector 110, a request to subscribe in a target-defined mode to network telemetry data for a network element. Network device 102A may, in response, provision network telemetry sensor 104A (if not already provisioned) to collect the requested network telemetry data for the network element and may determine the working mode of network telemetry sensor 104A as either a periodic streaming mode or an on-change mode.

As network telemetry sensor 104A operates in the working mode determined by network device 102A to collect network telemetry data and to send messages containing the network telemetry data to collector 110, network sensor 104A may include an explicit indication of the working mode of network sensor 104A in the messages containing the network telemetry data. For example, if the working mode of network telemetry sensor 104A is a periodic streaming mode, network sensor 104A may include an explicit indication that the working mode of network sensor 104A is a periodic streaming mode in the messages containing the network telemetry data. In another example, if the working mode of network telemetry sensor 104A is an on-change mode, network sensor 104A may include an explicit indication that the working mode of network sensor 104A is an on-change mode in the messages containing the network telemetry data. In this way, collector 110 may determine, based on the explicit indication of the working mode of network sensor 104A included in the network telemetry data received from network sensor 104A, the working mode of network sensor 104A.

The network telemetry data may include one or more data values that indicate the statistics of one or more network elements monitored by the network telemetry sensor. In some examples, the one or more data values included in the network telemetry data may include a counter value, which may be an integer that increases monotonically. In some examples, the one or more data values includes a gauge value, which may increase or decrease in value, and which may, in an example, be the instantaneous value of a specific resource, such as queue depth or temperature. In some examples, the one or more data values may be a rate value, which may be the rate at which a base metric, such as a counter or a gauge, changes, and which may, in an example, represent a measurement of bits per second over a specified interval. In some examples, the one or more data values may be an average value, which may be the average of several samples of a base metric, such as an average queue depth. In some examples, the one or more data values may be a peak value, which may be a maximum value among several samples of a base metric, such as a peak queue depth element. Other examples are possible.

In some examples, collector 110 may treat network telemetry data collected from network telemetry sensors 104 in different ways depending on the working mode of network telemetry sensors 104, such as by storing network telemetry data from sensors in a periodic streaming mode in a different database than network telemetry data from sensors in an on-change mode. As such, in some examples, collector 110 may determine, based on the explicit indication of the working mode of network telemetry sensor 104A is a periodic streaming mode or an on-change mode, a database out of a plurality of databases to store the network telemetry data from network telemetry sensor 104A. For example, collector 110 may determine, based on the network telemetry data explicitly indicating that network telemetry sensor 104A is operating in a periodic streaming mode, to store the network telemetry data in a first database and may determine, based on the network telemetry data explicitly indicating that network telemetry sensor 104A is operating in an on-change mode, to store the network telemetry data in a second database.

Figure 2:
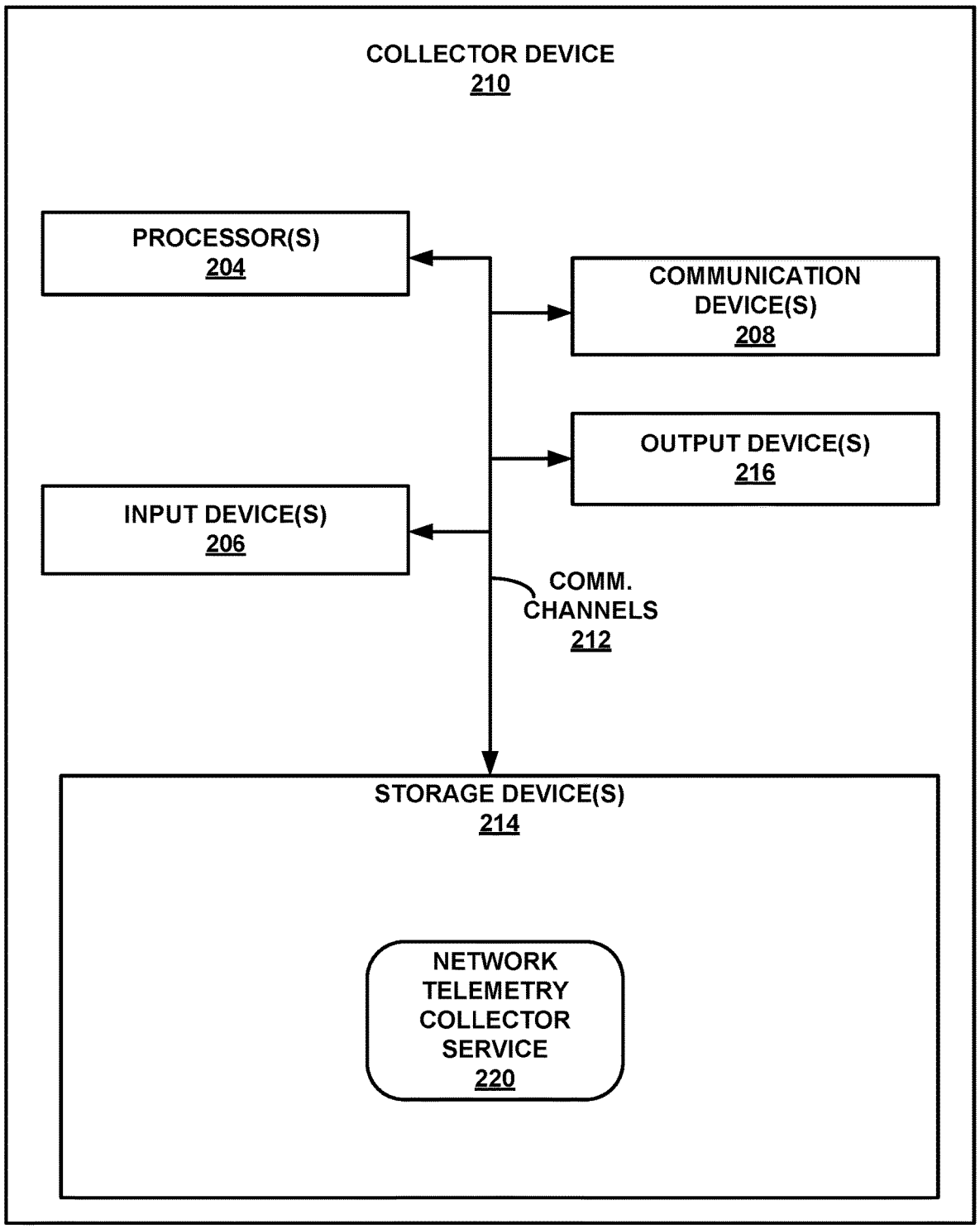
FIG. 2 is a block diagram illustrating an example collector device 210, in accordance with one or more aspects of the present disclosure.

FIG. 2 is a block diagram illustrating an example collector device 210, in accordance with one or more aspects of the present disclosure. Collector device 210 may be an example of collector 110 of FIG. 1. FIG. 2 illustrates only one particular example of collector device 210, and many other examples of collector device 210 may be used in other instances and may include a subset of the components shown, or may include additional components not shown, in FIG. 2.

As shown in the example of FIG. 2, collector device 210 includes one or more processors 204, one or more input devices 206, one or more communication devices 208, one or more output devices 216, and one or more storage devices 214. In some examples, collector device 210 may not include input devices 206 and/or output devices 216. Communication channels 212 may interconnect each of the components 204, 208, 206, 216, and 214 for inter-component communications (physically, communicatively, and/or operatively). In some examples, communication channels 212 may include a system bus, a network connection, an inter-process communication data structure, or any other method for communicating data between hardware and/or software.

One or more input devices 206 of collector device 210 may receive input. Examples of input are tactile, audio, and video input. Examples of input devices 206 include a presence-sensitive screen, touch-sensitive screen, mouse, keyboard, voice responsive system, video camera, microphone or any other type of device for detecting input from a human or machine.

One or more output devices 216 of collector device 210 may generate output. Examples of output are tactile, audio, and video output. Examples of output devices 216 include a presence-sensitive screen, sound card, video graphics adapter card, speaker, cathode ray tube (CRT) monitor, liquid crystal display (LCD), or any other type of device for generating output to a human or machine. Output devices 216 may include display devices such as cathode ray tube (CRT) monitor, liquid crystal display (LCD), or any other type of device for generating tactile, audio, and/or visual output.

One or more communication devices 208 of collector device 210 may communicate with one or more other computing systems or devices via one or more networks by transmitting and/or receiving network signals on the one or more networks. Examples of communication devices 208 include a network interface card (e.g. such as an Ethernet card), an optical transceiver, a radio frequency transceiver, or any other type of device that can send and/or receive information, such as through a wired or wireless network. Other examples of communication devices 208 may include short wave radios, cellular data radios, wireless Ethernet network radios, as well as universal serial bus (USB) controllers.

One or more storage devices 214 within collector device 210 may store information for processing during operation of collector device 210 (e.g., collector device 210 may store data accessed by one or more modules, processes, applications, services, nodes, application containers, or the like during execution at collector device 210). In some examples, storage devices 214 on collector device 210 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 214 may include redundant array of independent disks (RAID) configurations and one or more solid-state drives (SSD's).

Storage devices 214, in some examples, also include one or more computer-readable storage media. Storage devices 214 may be configured to store larger amounts of information than volatile memory. Storage devices 214 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 214 may store program instructions and/or data associated with one or more software/firmware elements or modules. For example, storage devices 214 may store various modules, applications, and/or services, such as network telemetry collector service 220.

Collector device 210 further includes one or more processors 204 that may implement functionality and/or execute instructions within collector device 210. For example, processors 204 may receive and execute instructions stored by storage devices 214 that execute the functionality of network telemetry collector service 220. These instructions executed by processors 204 may cause collector device 210 to store information within storage devices 214 during program execution. Processors 204 may also execute instructions of an operating system to perform one or more operations described herein.

In some examples, one or more processors 204 may include one or more internal processor cores for executing instructions, one or more internal caches or cache devices, a memory controller, and/or an input/output controller. In some examples, collector device 210 provides an environment of execution for a hypervisor, which is a software and/or firmware layer that provides a light-weight kernel and operates to provide virtualized operating environments for virtual machines, containers, and/or other types of virtual hosts.

In accordance with aspects of the present disclosure, one or more processors 204 may be configured to execute network telemetry collector service 220 to send, via one or more communication devices 208 to a network device, a request to subscribe, in a target-defined mode, to network telemetry data collected by a network telemetry sensor. The network telemetry data may, for example, statistics and/or metrics of a network element, such as a physical interface, a logical interface, an LSP, and the like, and such network telemetry data may be in the form of packet counts, byte counts, routes, next hops, filter counts, or other such metrics. The request to subscribe to network telemetry data collected by a network telemetry sensor may, in some examples, be in the form of one or more gRPC calls sent to the network device associated with the network telemetry sensor that collects the network telemetry data to establish, via gNMI, a streaming telemetry session between collector device 210 and the network device.

After sending the request to subscribe to network telemetry data collected by a network telemetry sensor to a network device, one or more processors 204 may be configured to execute network telemetry collector service 220 to receive, via one or more communication devices 208 from the network telemetry sensor, the network telemetry data regarding a network element that is collected by the network telemetry sensor. In some examples, one or more processors 204 may be configured to execute network telemetry collector service 220 to receive the network telemetry data in the form of gRPC messages.

The network telemetry data received from the network telemetry sensor may include an explicit indication of the working mode of the network telemetry sensor. Specifically, the network telemetry data may explicitly indicate whether the network telemetry sensor is operating in a periodic streaming mode or in an on-change mode. For example, when the network telemetry data is in the form of gRPC messages, the gRPC header as TCP payload of the gRPC messages may include a bit that explicitly indicates the working mode of the network telemetry sensor as one of: a periodic streaming mode or an on-change mode. One or more processors 204 may therefore be configured to execute network telemetry collector service 220 to determine, based on the network telemetry data received from the network telemetry sensor, the working mode of the network telemetry sensor, such as by processing the explicit indication of the working mode of the network telemetry sensor included in the network telemetry data.

One or more processors 204 may be configured to determine, based at least in part on the working mode of the network telemetry sensor indicated by the network telemetry data, that the network telemetry sensor has unexpectedly paused sending of further network telemetry data. For example, if one or more processors 204 determines, based on the explicit indication of the working mode of the network telemetry sensor included in the network telemetry data, that the working mode of the network telemetry sensor is a periodic streaming mode, one or more processors 204 may be configured to determine, after receiving a message containing network telemetry data from the network telemetry sensor, whether the reporting interval of the network telemetry sensor has elapsed without receiving another message containing network telemetry data from the network telemetry sensor. If one or more processors 204 determines that the reporting interval of the network telemetry sensor has elapsed without receiving another message containing network telemetry data from the network telemetry sensor, one or more processors 204 may be configured to determine that the network telemetry sensor has unexpectedly paused sending of further network telemetry data and may raise an alert (e.g., at one or more output device 216) indicating that the network telemetry sensor has unexpectedly paused sending of further network telemetry data.

Figure 3:
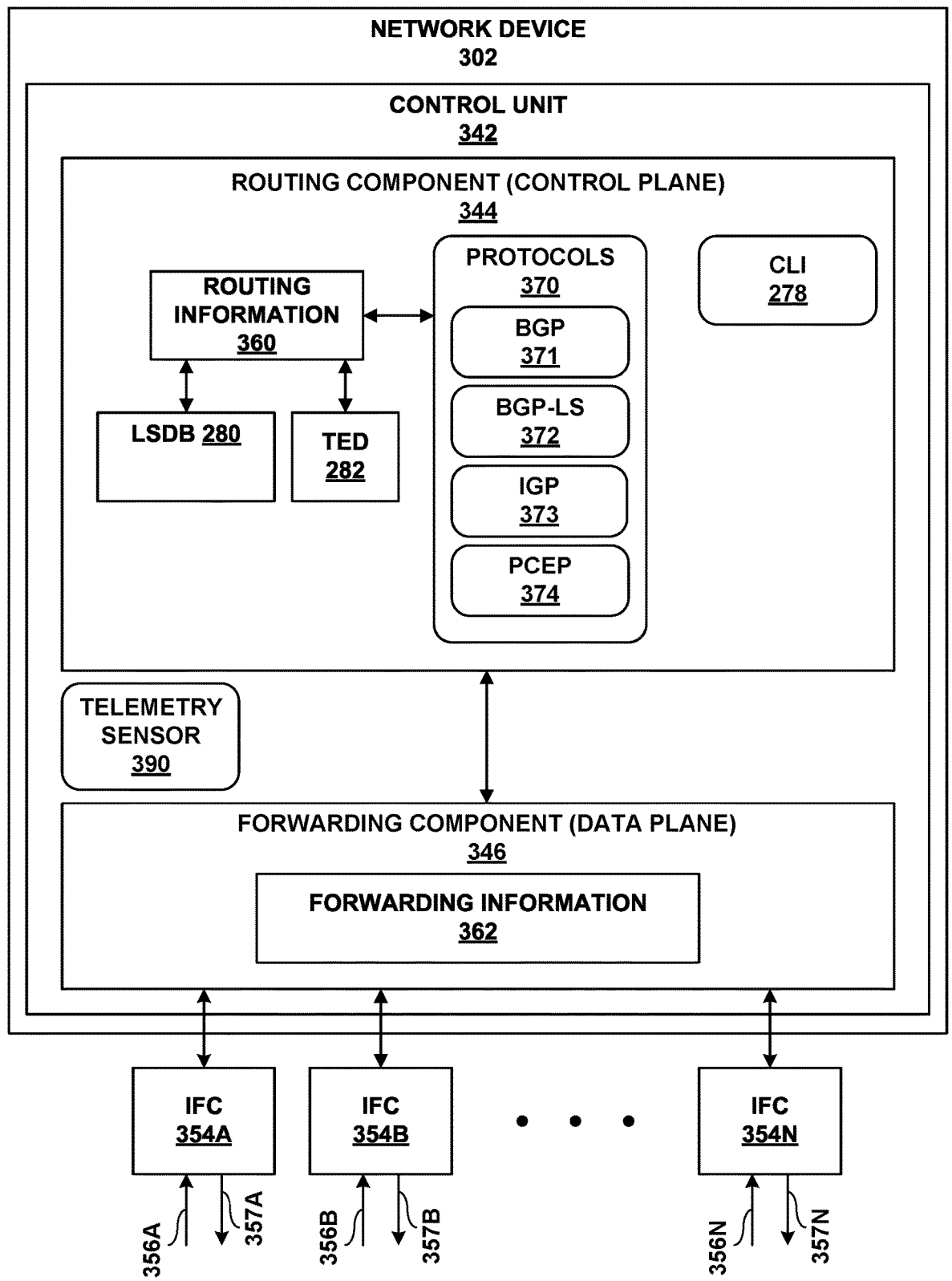
FIG. 3 is a block diagram illustrating an example network device capable of operating in accordance with the techniques described herein.

FIG. 3 is a block diagram illustrating an example network device 302 capable of operating in accordance with the techniques described herein. Network device 302 may be described as a routing device and may represent an example implementation of any of network devices 102 of FIG. 1. While described with respect to network device 302, the techniques described herein may be implemented by any other type of network device capable of implementing segment routing.

In the example of FIG. 3, network device 302 includes or communicates with interface cards 354A-354N ("IFCs 354") that receive and send data units, such as packet flows, via network links 356A-356N and 357A-357N, respectively. Network device 302 may include a chassis (not shown) having a number of slots for receiving a set of cards, including IFCs 354. Each card may be inserted into a corresponding slot of the chassis for electrically and/or optically coupling the card to routing component 344 via high-speed switch (not shown), which may comprise, for example, switch fabric, switchgear, a configurable network switch or hub, or other high-speed switching mechanisms. IFCs 354 may be coupled to network links 356A-356N and 357A-357N via a number of physical interface ports (not shown). Generally, IFCs 354 may each represent one or more network interfaces by which network device 302 may interface with links of a network.

In general, network device 302 may include a control unit 342 that determines routes of received packets and forwards the packets accordingly via IFCs 354. In the example of FIG. 3, control unit 342 includes routing component (control plane) 344 that configures and controls packet forwarding operations applied by forwarding component (data plane) 246.

Routing component 344 provides an operating environment for various routing protocols 370 that execute at different layers of a network stack. Routing component 344 is responsible for the maintenance of routing information 360 to reflect the current topology of a network and other network entities to which network device 302 is connected. In particular, routing protocols periodically update routing information 360 to accurately reflect the topology of the network and other entities based on routing protocol messages received by network device 302. The protocols may be software processes executing on one or more processors. For example, routing component 344 includes network protocols that operate at a network layer of the network stack, which are typically implemented as executable software instructions.

In the example of FIG. 3, protocols 370 may include Border Gateway Protocol (BGP) 371 to exchange routing and reachability information among routing domains in a network and BGP-LS 372 to exchange traffic engineering and segment routing policy information among routing domains in the network. The BGP-LS protocol is described in additional detail in H. Gredler, et al., "North-Bound Distribution of Link-State and Traffic Engineering (TE) Information using BGP," Internet Engineering Task Force (IETF) RFC 7752, March 2016, the entire contents of which are incorporated herein by reference.

Protocols 370 may also include IGP 373 to exchange link state information and facilitate forwarding of packets or other data units between routers within each of the routing domains. In some examples, IGP 373 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and RFC 8362, by A. Lindem et al., entitled "OSPFv3 Link State Advertisement (LSA) Extendibility," dated April 2018. In some examples, IGP 373 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990 (republication of ISO/IEC 10589, last updated November 2002). IGP 273 may include IS-IS extensions that support traffic engineering, as described in RFC 5305, by T. Li et al., entitled "IS-IS Extensions for Traffic Engineering," dated October 2008. In some examples, network device 302 may include both an OSPF component and an IS-IS component.

Protocols 370 may also include configuration protocols. For example, protocols 370 may include PCEP 274 in accordance with RFC 5440, by J P. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011. Protocols 370 may include other routing protocols (not shown), such as Label Distribution Protocol (LDP), Resource Reservation Protocol with Traffic Extensions (RSVP-TE), routing information protocol (RIP), or other network protocols.

By executing the routing protocols, routing component 344 identifies existing routes through the network and determines new routes through the network. Routing component 344 stores routing information 360 that includes, for example, known routes through the network. Forwarding component 346 stores forwarding information 362 that includes destinations of output links 357. Forwarding information 362 may be generated in accordance with routing information 360.

Routing component 344 includes a link state database (LSDB) 380 for storing domain topology information including SIDs and labels for provisioned segments, e.g., adjacency segments, prefix segments, and binding segments, within the routing domain of network device 302. The contents of LSDB 380 are maintained in accordance with an IGP 373 and have the scope of a single routing domain. Routing component 344 further includes a Traffic Engineering Database (TED) 382 that augments LSDB 380 with TE link attributes. Each of LSDB 380 and TED 282 may be in the form of a variety of data structures, such as a number of tables, link lists, radix trees, databases, flat files, or other data structures.

Although described for purposes of example with respect to a router, network device 302 may be more generally a network device having routing functionality, and need not necessarily be a dedicated routing device. The architecture of network device 302 illustrated in FIG. 3 is shown as an example. The techniques of this disclosure are not limited to this architecture. In other examples, network device 302 may be configured in a variety of ways. In one example, some of the functionally of control unit 342 may be distributed within IFCs 354. In another example, control unit 342 may comprise a plurality of packet forwarding engines operated as slave routers.

Control unit 342 may be implemented solely in software, or hardware, or may be implemented as a combination of software, hardware, or firmware. For example, control unit 342 may include one or more processors that execute program code in the form of software instructions. In that case, the various software components/modules of control unit 342 may comprise executable instructions stored on a computer-readable storage medium, such as computer memory or hard disk.

In FIG. 3, and in accordance with one or more aspects of the present disclosure, network device 302 may receive, from a collector such as collector 110 of FIG. 1 or collector device 210 of FIG. 2, a request to subscribe, in a target-defined mode, to network telemetry data regarding a network element that is collected by a network telemetry sensor. The request to subscribe to network telemetry data collected by a network telemetry sensor may, in some examples, be in the form of one or more gRPC calls to establish, via gNMI, a streaming telemetry session between network device 302 and the collector.

Network device 302 may in response to receiving the request to subscribe to network telemetry data, provision network telemetry sensor 390 to collect network telemetry data regarding the network element specified in the request. For example, network telemetry sensor 390 may collect the bytes of data transmitted by the network element, the bytes of data received by the network element, the number of packets transmitted by the network element, the number of packets received by the network element, and/or the operating state of the network element (e.g., whether the network element is up or down).

Examples of network elements for which network telemetry sensor 390 may collect network telemetry data may include a physical interface, a logical interface, an LSP, and the like specified by the request. In the example of FIG. 3, examples of network elements for which network telemetry sensor 390 may collect network telemetry data may include one or more of IFCs 354, network links 356A-356N and 357A-357N, routing component 344, forwarding component 346, and the like.

Because the request received by network device 302 indicates a request to subscribe, in a target-defined mode, to network telemetry data, network device 302 may determine the working mode of network telemetry sensor 390 without having the working mode of network telemetry sensor 390 be specified by the collector. Instead, network device 302 may be able to make the determination of the working mode of network telemetry sensor 390 to determine whether network telemetry sensor 390 is to operate in a periodic streaming mode or in an on-change mode.

Network device 302 may determine the working mode of network telemetry sensor 390 using any suitable factors other than any explicit or implicit indications of a working mode received from the controller. In some examples, network device 302 may determine, based on one or more characteristics of the network element that network telemetry sensor 390 monitors to collect network telemetry data, whether to set the working mode of network telemetry sensor 390 to a periodic streaming mode or to an on-change mode. For example, network device 302 may determine the rate at which the statistics of the network element to be monitored by network telemetry sensor 390 changes values. If network device 302 determines that the rate which the statistics of the network element to be monitored by network telemetry sensor 390 changes values is high (e.g., more than a specified number of times over a specified time period), network device 302 may set the working mode of network telemetry sensor 390 to a periodic streaming mode. Conversely, if network device 302 determines that the rate which the statistics of the network element to be monitored by network telemetry sensor 390 changes values is low (e.g., less than a specified number of times over a specified time period), network device 302 may set the working mode of network telemetry sensor 390 to an on-change mode.

As network telemetry sensor 390 executes at control unit 342 of network device 302 to monitor a network element and to collect and send network telemetry data to the collector, network telemetry sensor 390 may include an explicit indication of the working mode of network telemetry sensor 390 in the network telemetry data that it sends to the collector. Specifically, the network telemetry data sent by network telemetry sensor 390 may explicitly indicate whether network telemetry sensor 390 is operating in a periodic streaming mode or in an on-change mode. For example, when the network telemetry data is sent by network telemetry sensor 390 in the form of gRPC messages, network telemetry sensor 390 may include, in the gRPC header as TCP payload of the gRPC messages, a bit that explicitly indicates the working mode of the network telemetry sensor as one of: a periodic streaming mode or an on-change mode.

The following is an example of the gRPC header of the gRPC messages sent by network telemetry sensor 390 to a controller:

2020/10/19 17:41:26 system_id: sup-tb4-geodc-1-brackla
2020/10/19 17:41:26 component_id: 0
2020/10/19 17:41:26 sensor_name: sensor_1000
2020/10/19 17:41:26 subscribed_path: /interfaces/interface/state/
2020/10/19 17:41:26 streamed_path: /junos/system/linecard/interface/
2020/10/19 17:41:26 component: evo-aftmand
2020/10/19 17:41:26 sequence_number: 2097377
2020/10/19 17:41:26 export_timestamp: 1603129131774
new field ##
<Date>    <Time> on_change: 1(true) OR 0 (false: streaming)

-continued

```
end ##
2020/10/19 17:41:26 update {
2020/10/19 17:41:26   timestamp: 16031291317692548 34
2020/10/19 17:41:26   prefix: /interfaces/interface[name='et-0/0/5:2']/state/counters
2020/10/19 17:41:26 update {
2020/10/19 17:41:26   path {
2020/10/19 17:41:26     elem {
2020/10/19 17:41:26       name: in-pkts
2020/10/19 17:41:26     }
2020/10/19 17:41:26   }
2020/10/19 17:41:26   val {
2020/10/19 17:41:26     uint_val: 0
2020/10/19 17:41:26   }
2020/10/19 17:41:26 }
```

As can be seen, the example gRPC header includes an "on_change" field having a value that indicates whether network telemetry sensor 390 is operating in a periodic streaming mode or an on-change mode. If the value of the "on_change" field is 1 (i.e., true), then the "on_change" field indicates that network telemetry sensor 390 is operating in an on-change mode. If the value of the "on_change" field is 0 (i.e., false), then the "on_change" field indicates that network telemetry sensor 390 is operating in a periodic streaming mode.

Modules illustrated herein and/or described in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 4:
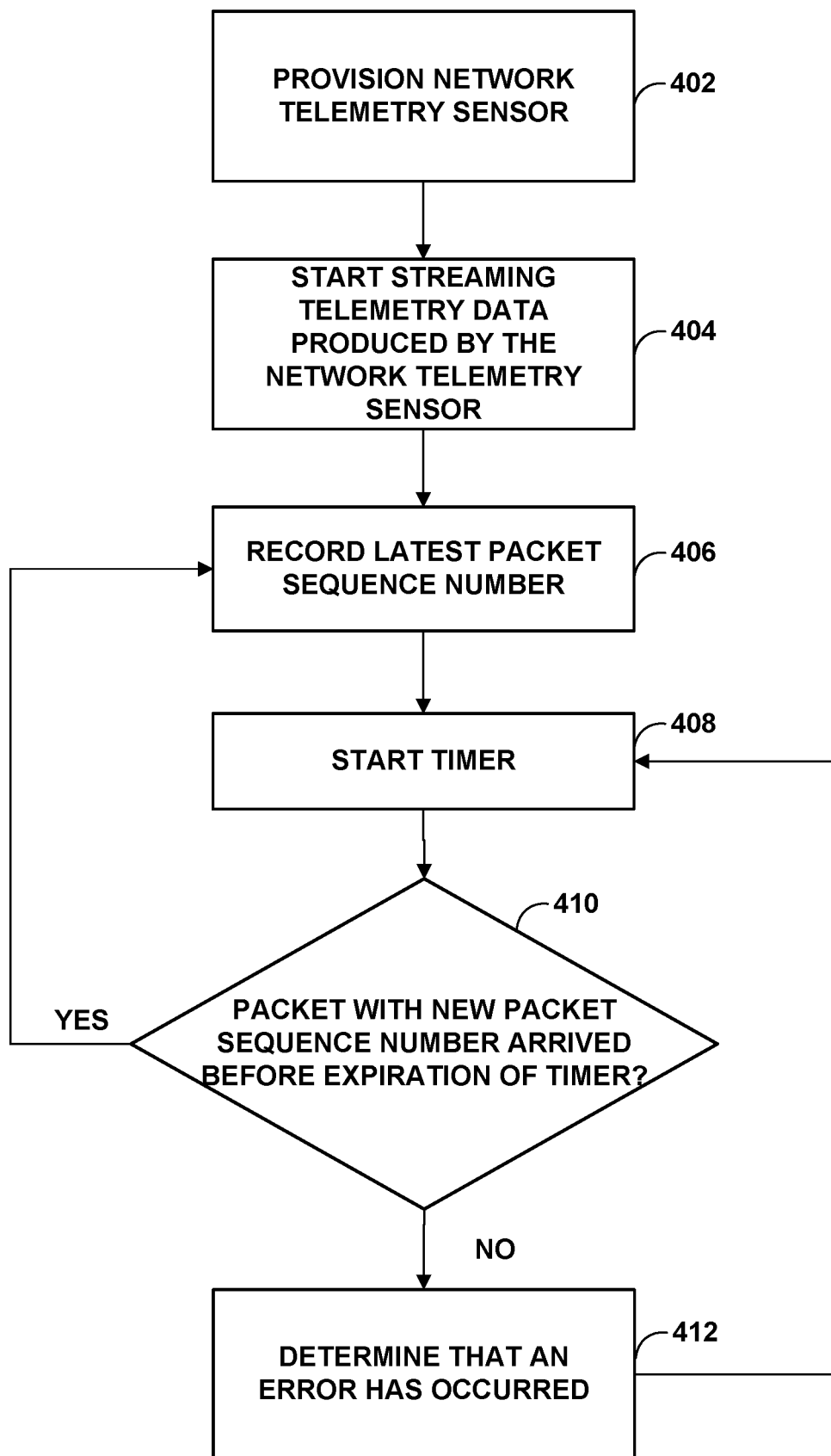
FIG. 4 is a flow diagram illustrating an example operation of a network device to determine whether a network telemetry sensor has unexpectedly paused streaming of network telemetry data, in accordance with one or more techniques of this disclosure.

FIG. 4 is a flow diagram illustrating an example operation of a network device to determine whether a network telemetry sensor has unexpectedly paused streaming of network telemetry data, in accordance with one or more techniques of this disclosure. The flow diagram is described with respect to network device 302 of FIG. 3.

As shown in FIG. 4, network device 302 may receive a request from a collector to subscribe to network telemetry data collected by a network telemetry sensor in a target-defined mode. Network device 302 may, in response to receiving the request, provision network telemetry sensor 390 in a periodic streaming mode to collect and stream network telemetry data (402). Network telemetry sensor 390 may therefore start streaming network telemetry data to the collector (404).

Network device 302 may, when network telemetry sensor 390 operates in a periodic streaming mode, determine whether network telemetry sensor 390 has unexpectedly paused streaming of the network telemetry data. To that end, when network device 302 receives a packet of network telemetry data from network telemetry sensor 390, network device 302 may record the packet sequence number of the packet as the latest packet sequence number (406).

Network device 302 may also start a timer that is equal to the reporting interval of the network telemetry sensor 390 (408). For example, if network telemetry sensor 390 has a reporting interval of 30 seconds, network device 302 may start a 30-second timer when network device 302 receives a packet of network telemetry data from network telemetry sensor 390.

At the expiration of the timer, network device 302 may determine whether it has received a new packet of network telemetry data from network telemetry sensor 300. Because network telemetry sensor 390 in the periodic streaming mode should periodically send packets of network telemetry data at the reporting interval (e.g., every 30 seconds), network device 302 may determine that network telemetry sensor 390 has unexpectedly paused streaming of network telemetry data if network device 302 has not received a new packet of network telemetry data from network telemetry sensor 390 at the end of the reporting interval.

As such, network device 302 may determine whether it has, by the time the timer expires, received a packet of network telemetry data from network telemetry sensor 390 having a packet sequence number that is different from the latest packet sequence number recorded by network device 302 at the start of the timer (410). For example, if network device 302 determines that the latest packet sequence number recorded by network device 302 at the expiration of the timer is the same as the latest packet sequence number recorded by network device 302 at the start of the timer, network device 302 may determine that network device 302 has not received a new packet of network telemetry data from network telemetry sensor 390.

If network device 302 determines that it has received a new packet of network telemetry data from network telemetry sensor 390, network device 302 may record the packet sequence number of the new packet of network telemetry data as the latest sequence number (406). Conversely, if network device 302 determines that it has not received a new packet of network telemetry data from network telemetry sensor 390, network device 302 may determine that an error has occurred and that network telemetry sensor 390 has unexpectedly paused streaming of network telemetry data (412). Network device 302 may therefore log such an error and may start another timer that is equal to the reporting interval of network telemetry sensor 390 (408) to wait for the network telemetry sensor to resume streaming of network telemetry data.

Figure 5:
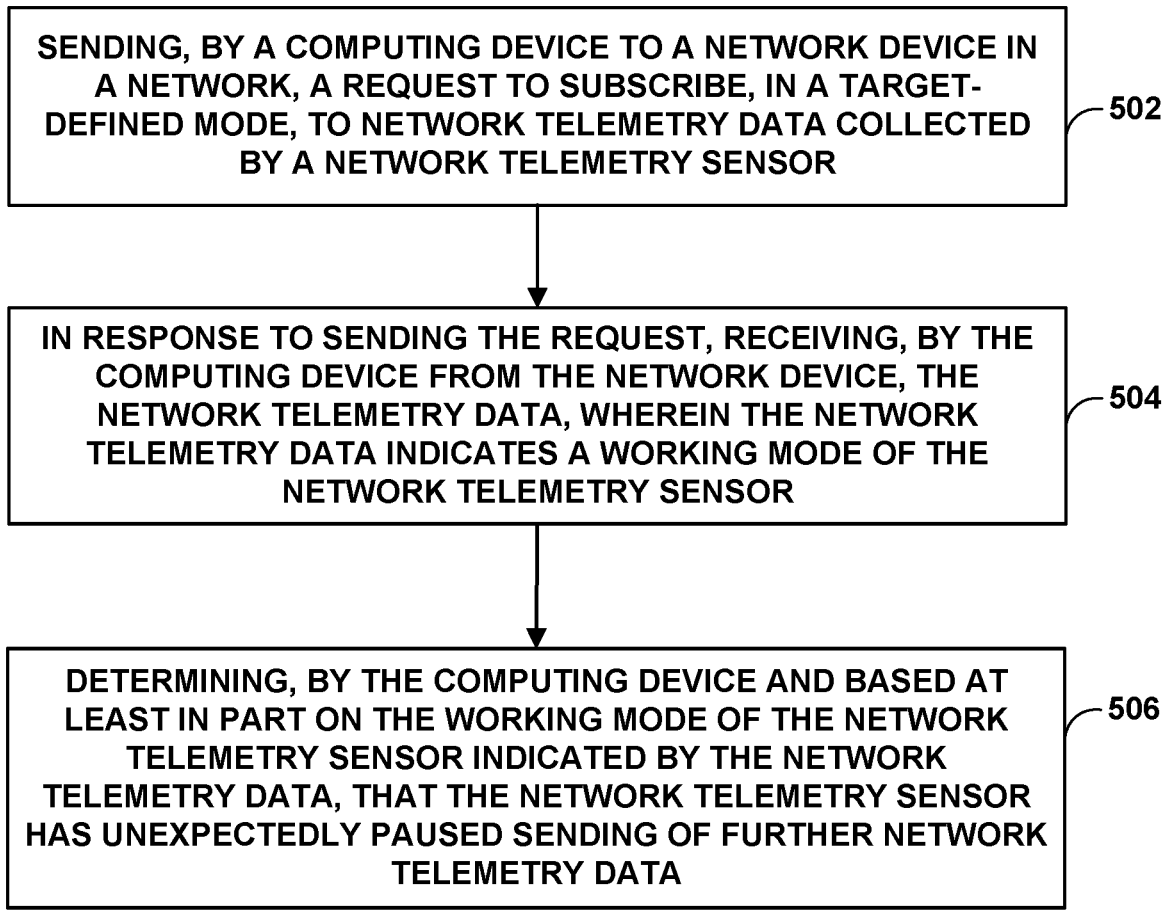
FIG. 5 is a flow diagram illustrating an example operation of a computing device, in accordance with one or more techniques of this disclosure.

FIG. 5 is a flow diagram illustrating an example operation of a computing device, in accordance with one or more techniques of this disclosure. The computing device may be a computing device of collector device 210 of FIG. 2 or other collectors described herein. The flow diagram is described with respect to collector device 210.

As shown in FIG. 5, collector device 210 may send, to a network device in a network, a request to subscribe, in a target-defined mode, to network telemetry data collected by a network telemetry sensor (502). Collector device 210 may, in response to sending the request, receiving, by the computing device from the network device, the network telemetry data, wherein the network telemetry data indicates a working mode of the network telemetry sensor (504). Collector device 210 may determine, based at least in part on the working mode of the network telemetry sensor indicated by the network telemetry data, that the network telemetry sensor has unexpectedly paused sending of further network telemetry data.

Figure 6:
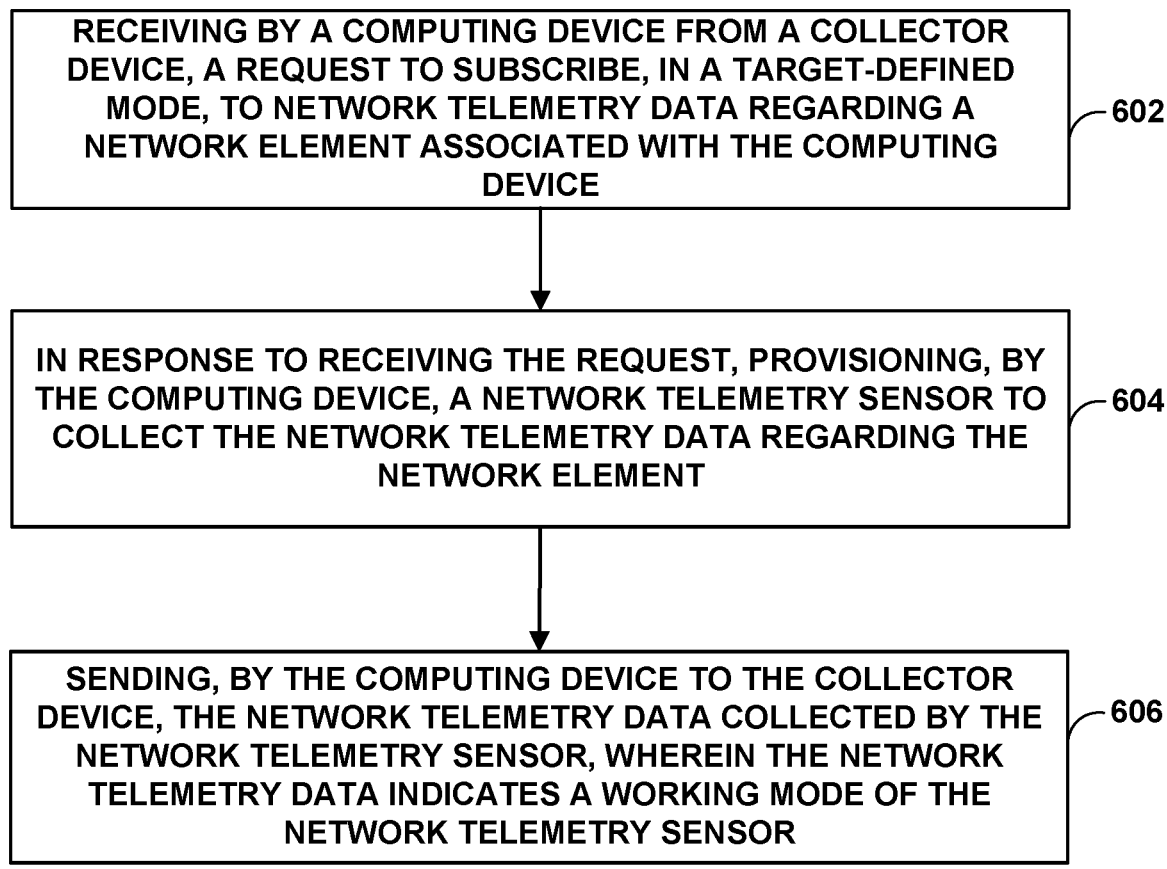
FIG. 6 is a flow diagram illustrating an example operation of a computing device, in accordance with one or more techniques of this disclosure.

FIG. 6 is a flow diagram illustrating an example operation of a computing device, in accordance with one or more techniques of this disclosure. The computing device may be a computing device of network device 302 of FIG. 3 or other network devices described herein. The flow diagram is described with respect to network device 302.

As shown in FIG. 6, network device 302 may receive, from a collector device, a request to subscribe, in a target-defined mode, to network telemetry data regarding a network element associated with the computing device (602). Network device 302 may, in response to receiving the request, provision a network telemetry sensor 390 to collect the network telemetry data regarding the network element (604). Network device 302 may send, to the collector device, the network telemetry data collected by the network telemetry sensor 390, wherein the network telemetry data indicates a working mode of the network telemetry sensor 390 (606).

This disclosure includes the following examples.

Example 1: A method includes receiving by a computing device from a collector device, a request to subscribe, in a target-defined mode, to network telemetry data regarding a network element associated with the computing device; in response to receiving the request, provisioning, by the computing device, a network telemetry sensor to collect the network telemetry data regarding the network element; and sending, by the computing device to the collector device, the network telemetry data collected by the network telemetry sensor, wherein the network telemetry data indicates a working mode of the network telemetry sensor.

Example 2: The method of example 1, wherein provisioning the network telemetry sensor further comprises: determining, by the computing device, the working mode of the network telemetry sensor as one of: a periodic streaming mode or an on-change mode.

Example 3: The method of example 2, wherein the working mode of the network telemetry sensor is the periodic streaming mode, further includes recording, by the computing device, a latest sequence number of network telemetry data streamed from the network telemetry sensor; starting, by the computing device, a timer set to a reporting interval of the network telemetry sensor; in response to the timer expiring, determining, by the computing device, whether the latest sequence number of the network telemetry data has changed; and in response to determining that the latest sequence number of the network telemetry data has not changed, recording, by the computing device, an indication of a potential error associated with the network telemetry sensor.

Example 4: The method of any of examples 2 and 3, wherein a header of the network telemetry data includes a value that indicates the working mode of the network telemetry sensor as either the periodic streaming mode or the on-change mode.

Example 5: The method of example 4, wherein the network telemetry data comprises gRPC Remote Procedure Call (gRPC) messages, and wherein the header of the network telemetry data comprises a gRPC header of the gRPC messages.

Example 6: The method of any of examples 1-5, wherein determining the working mode of the network telemetry sensor further comprises: determining, by the computing device, the working mode of the network telemetry sensor based at least in part on one or more characteristics of the network element.

Example 7: A computing device includes a memory; and processing circuitry in communication with the memory and configured to: receive, from a collector device, a request to subscribe, in a target-defined mode, to network telemetry data regarding a network element associated with the computing device; in response to receiving the request, provision a network telemetry sensor to collect the network telemetry data regarding the network element; and send, to the collector device, the network telemetry data collected by the network telemetry sensor, wherein the network telemetry data indicates a working mode of the network telemetry sensor.

Example 8: The computing device of example 7, wherein to provision the network telemetry sensor, the processing circuitry is further configured to: determine the working mode of the network telemetry sensor as one of: a periodic streaming mode or an on-change mode.

Example 9: The computing device of example 8, wherein the working mode of the network telemetry sensor is the periodic streaming mode, and wherein the processing circuitry is further configured to: record a latest sequence number of network telemetry data streamed from the network telemetry sensor; start a timer set to a reporting interval of the network telemetry sensor; in response to the timer expiring, determine whether the latest sequence number of the network telemetry data has changed; and in response to determining that the latest sequence number of the network telemetry data has not changed, record an indication of a potential error associated with the network telemetry sensor.

Example 10: The computing device of any of examples 8 and 9, wherein a header of the network telemetry data includes a value that indicates the working mode of the network telemetry sensor as either the periodic streaming mode or the on-change mode.

Example 11: The computing device of example 10, wherein the network telemetry data comprises gRPC Remote Procedure Call (gRPC) messages, and wherein the header of the network telemetry data comprises a gRPC header of the gRPC messages.

Example 12: The computing device of any of examples 8-11, wherein to determine the working mode of the network telemetry sensor, the processing circuitry is further configured to: determine the working mode of the network telemetry sensor based at least in part on one or more characteristics of the network element.

Example 13: A non-transitory computer-readable storage medium encoded with instructions that, when executed, cause one or more programmable processors of a computing device to: receive, from a collector device, a request to subscribe, in a target-defined mode, to network telemetry data regarding a network element associated with the computing device; in response to receiving the request, provision a network telemetry sensor in a working mode to collect the network telemetry data regarding the network element; and send, to the collector device, the network telemetry data collected by the network telemetry sensor, wherein the network telemetry data indicates the working mode of the network telemetry sensor.

Example 14: The non-transitory computer-readable storage medium of example 13, wherein the instructions that cause the one or more programmable processors to provision the network telemetry sensor further cause the one or more programmable processors to: determining, by the computing device, the working mode of the network telemetry sensor as one of: a periodic streaming mode or an on-change mode.

Example 15: The non-transitory computer-readable storage medium of example 14, wherein the working mode of the network telemetry sensor is the periodic streaming mode, and wherein the instructions further cause the one or more programmable processors to: record a latest sequence number of network telemetry data streamed from the network telemetry sensor; start a timer set to a reporting interval of the network telemetry sensor; in response to the timer expiring, determine whether the latest sequence number of the network telemetry data has changed; and in response to determining that the latest sequence number of the network telemetry data has not changed, record an indication of a potential error associated with the network telemetry sensor.

Example 16: The non-transitory computer-readable storage medium of any of example 14 and 15, wherein a header of the network telemetry data includes a value that indicates the working mode of the network telemetry sensor as either the periodic streaming mode or the on-change mode.

Example 17: The non-transitory computer-readable storage medium of example 16, wherein the network telemetry data comprises gRPC Remote Procedure Call (gRPC) messages, and wherein the header of the network telemetry data comprises a gRPC header of the gRPC messages.

Example 18: The non-transitory computer-readable storage medium of any of examples 14-17, wherein the instructions that cause the one or more programmable processors to determine the working mode of the network telemetry sensor further cause the one or more programmable processors to: determine the working mode of the network telemetry sensor based at least in part on one or more characteristics of the network element.

Example 19: A method comprising: sending, by a computing device to a network device in a network, a request to subscribe, in a target-defined mode, to network telemetry data regarding a network element associated with the network device; receiving, by the computing device from the network device, the network telemetry data, wherein the network telemetry data explicitly indicates a current working mode of a network telemetry sensor that collects the network telemetry data regarding the network element; and determine, by the computing device and based at least in part on the current working mode of the network telemetry sensor indicated by the network telemetry data, that streaming of the network telemetry data has unexpectedly paused.

Example 20: The method of example 19, wherein the network telemetry data indicates the current working mode of the network telemetry sensor is one of: a periodic streaming mode or an on-change mode.

Example 21: The method of example 20, wherein a header of the network telemetry data includes a value that indicates the working mode of the network telemetry sensor as either the periodic streaming mode or the on-change mode.

Example 22: The method of example 21, wherein the network telemetry data comprises gRPC Remote Procedure Call (gRPC) messages, and wherein the header of the network telemetry data comprises a gRPC header of the gRPC messages.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium or computer-readable storage device may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:
1. A method comprising:
receiving by a computing device from a collector device, a request to subscribe, in a target-defined mode, to network telemetry data regarding a network element associated with the computing device;

in response to receiving the request, provisioning, by the computing device, a network telemetry sensor to collect the network telemetry data regarding the network element;

detecting, by the computing device, a working mode in which the network telemetry sensor is operating to stream the network telemetry data, out of a plurality of working modes for streaming the network telemetry data, as a periodic streaming mode based at least in part on a rate at which statistics of the network element changes values in the network telemetry data collected and streamed by the network telemetry sensor, including:

determining, by the computing device, that the rate at which statistics of the network element changes values exceeds a specified rate; and in response to determining that the rate at which statistics of the network element changes values exceeds the specified rate, determining, by the computing device, that the working mode of the network telemetry sensor is the periodic streaming mode; and sending, by the computing device to the collector device, the network telemetry data collected by the network telemetry sensor, wherein a header of the network telemetry data indicates the working mode of the network telemetry sensor.

2. The method of claim 1, wherein the network telemetry data comprises gRPC Remote Procedure Call (gRPC) messages, and wherein the header of the network telemetry data comprises a gRPC header of the gRPC messages.

3. A computing device comprising:
a memory; and
processing circuitry in communication with the memory and configured to:

receive, from a collector device, a request to subscribe, in a target-defined mode, to network telemetry data regarding a network element associated with the computing device;

in response to receiving the request, provision a network telemetry sensor to collect the network telemetry data regarding the network element;

detect a working mode in which the network telemetry sensor is operating to stream the network telemetry data, out of a plurality of working modes for streaming the network telemetry data, as a periodic streaming mode based at least in part on a rate at which statistics of the network element changes values in the network telemetry data collected and streamed by the network telemetry sensor including:

determining that the rate at which statistics of the network element changes values exceeds a specified rate; and in response to determining that the rate at which statistics of the network element changes values exceeds the specified rate, determining that the working mode of the network telemetry sensor is the periodic streaming mode; and send, to the collector device, the network telemetry data collected by the network telemetry sensor, wherein a header of the network telemetry data includes a value that indicates the working mode of the network telemetry sensor.

4. The computing device of claim 3, wherein the network telemetry data comprises gRPC Remote Procedure Call (gRPC) messages, and wherein the header of the network telemetry data comprises a gRPC header of the gRPC messages.

5. A non-transitory computer-readable storage medium encoded with instructions that, when executed, cause one or more programmable processors of a computing device to:

receive, from a collector device, a request to subscribe, in a target-defined mode, to network telemetry data regarding a network element associated with the computing device;

in response to receiving the request, provision a network telemetry sensor in a working mode to collect the network telemetry data regarding the network element;

detect a working mode in which the network telemetry sensor is operating to stream the network telemetry data, out of a plurality of working modes for streaming the network telemetry data, as a periodic streaming mode based at least in part on a rate at which statistics of the network element changes values in the network telemetry data collected and streamed by the network telemetry sensor, including:

determining that the rate at which statistics of the network element changes values exceeds a specified rate; and in response to determining that the rate at which statistics of the network element changes values exceeds the specified rate, determining that the working mode of the network telemetry sensor is the periodic streaming mode; and send, to the collector device, the network telemetry data collected by the network telemetry sensor, wherein a header of the network telemetry data includes a value that indicates the working mode of the network telemetry sensor.

6. The non-transitory computer-readable storage medium of claim 5, wherein the network telemetry data comprises gRPC Remote Procedure Call (gRPC) messages, and wherein the header of the network telemetry data comprises a gRPC header of the gRPC messages.

\* \* \* \* \*

UNITED STATES PATENT AND TRADEMARK OFFICE
CERTIFICATE OF CORRECTION

PATENT NO. : 11,888,680 B1  
APPLICATION NO. : 17/661546  
DATED : January 30, 2024  
INVENTOR(S) : Yanqing Liu Page 1 of 1

It is certified that error appears in the above-identified patent and that said Letters Patent is hereby corrected as shown below:

In the Claims

Column 21, Line 49 Claim 3: Replace "the network telemetry sensor including" with -- the network telemetry sensor, including --.

Signed and Sealed this  
First Day of April, 2025

Coke Morgan Stewart  
*Acting Director of the United States Patent and Trademark Office*